United States Patent [19]

Rettberg et al.

[11] Patent Number: 4,700,347
[45] Date of Patent: Oct. 13, 1987

[54] DIGITAL PHASE ADJUSTMENT

[75] Inventors: Randall D. Rettberg, Concord; Lance A. Glasser, Lexington, both of Mass.

[73] Assignee: Bolt Beranek and Newman Inc., Cambridge, Mass.

[21] Appl. No.: 701,116

[22] Filed: Feb. 13, 1985

[51] Int. Cl.⁴ .............................................. G06F 11/00
[52] U.S. Cl. ........................................ 371/1; 328/55
[58] Field of Search ................. 371/1, 25; 328/55, 56; 364/200, 900; 324/73 R

[56] References Cited

U.S. PATENT DOCUMENTS

| Re. 31,056 | 10/1982 | Chau | 371/1 |
| 4,092,589 | 5/1978 | Chau | 371/1 |
| 4,122,995 | 10/1978 | Franke | 371/1 |
| 4,415,984 | 11/1983 | Gryjer | 364/900 |
| 4,488,297 | 12/1984 | Vaid | 328/55 |
| 4,520,483 | 5/1985 | Arita | 371/1 |
| 4,542,505 | 9/1985 | Binoeder | 371/1 |

Primary Examiner—Michael R. Fleming
Attorney, Agent, or Firm—Pahl, Lorusso & Loud

[57] ABSTRACT

In the apparatus disclosed herein, a data signal to be phase adjusted is applied to a plurality of delay lines providing progressively greater delays. The outputs of the several delay lines are compared over a period of time and a selection of one of the output signals for utilization is made based on choosing that delay line output which is in opposition to that pair of outputs which straddles or encompasses the most transitions.

7 Claims, 9 Drawing Figures

DIGITAL PHASE ADJUSTMENT

BACKGROUND OF THE INVENTION

The present invention relates to digital data processing apparatus and more particularly to apparatus for adjusting the phase of data signals arriving at utilization circuitry so as to compensate for uncontrollable phase shifts originating apart from the data utilization circuitry.

As digital data processing systems have become faster and more complex, an increasingly serious problem has been that of synchronizing the various data and clock signals which are utilized throughout the system. As the data and clock rates are pushed ever higher, the delays associated with even short lengths of wire become significant due to the phase shift they introduce, owing to the finite speed of propagation of pulse signals along the wire. To date, most efforts at dealing with these problems have concentrated on keeping circuit paths as short as possible. Even so, in certain high speed systems it has been necessary to tediously adjust wire or cable lengths on an empirical basis so as to assure that the data and clock signals arrive at a given utilization circuit with the proper phase relationship so that data errors will not occur.

Problems of timing are compounded in multiprocessor systems since it becomes extremely difficult to equalize the transit times between all combinations of subsystems, even though various of these subsystems may each be considered a region of substantially synchronous operation. While it is possible to globally distribute a clock signal of precisely controlled frequency, it is difficult to control relative phasing from one region to another. Another source of timing problems originates with the variation of delay with changing temperature through the various input and output buffer circuits which are normally associated with each data line of significant length.

While the need for phase adjustment in accordance with the present invention is necessitated by the use of very high speed data transfer rates and the relatively significant magnitude of the phase shifts introduced by variations in signal path lengths, it will also be understood that changes in such delays typically occur relatively slowly. Such delays are, for example, introduced by the heating up of the transistor junctions which comprise the digital logic gates generating and receiving the data signals. Accordingly, while the initial adjustment needed may not be known and the cause of changes in phase shift may be both unknown and unpredictable, it is not necessary to make adjustments at a relatively high rate since the changes will be relatively gradual once the system is up and operational.

Among the several objects of the present invention may be noted the provision of apparatus for automatically adjusting the phase of data signals arriving at utilization circuitry so as to compensate for uncontrollable phase shifts originating apart from the utilization circuitry; the provision of such apparatus which will operate automatically; the provision of such apparatus which facilitates very high speed operations; the provision of such apparatus which facilitates the cooperative operation of multiple regions of synchronous behavior in a digital data processing system; the provision of such apparatus which is highly reliable and which is of relatively simple and inexpensive construction. Other objects and features are in part apparent and in part be pointed out hereinafter.

SUMMARY OF THE INVENTION

Briefly, apparatus in accordance with the present invention employs an adjustable delay line which provides to a data signal a delay of selectable duration. The delayed data signal is compared with a local standard for a plurality of different delay durations and discrepancies in the comparisons are detected. The selection of a particular delay to be applied to the data signal provided to the utilization circuitry is then based upon the detected discrepancies.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
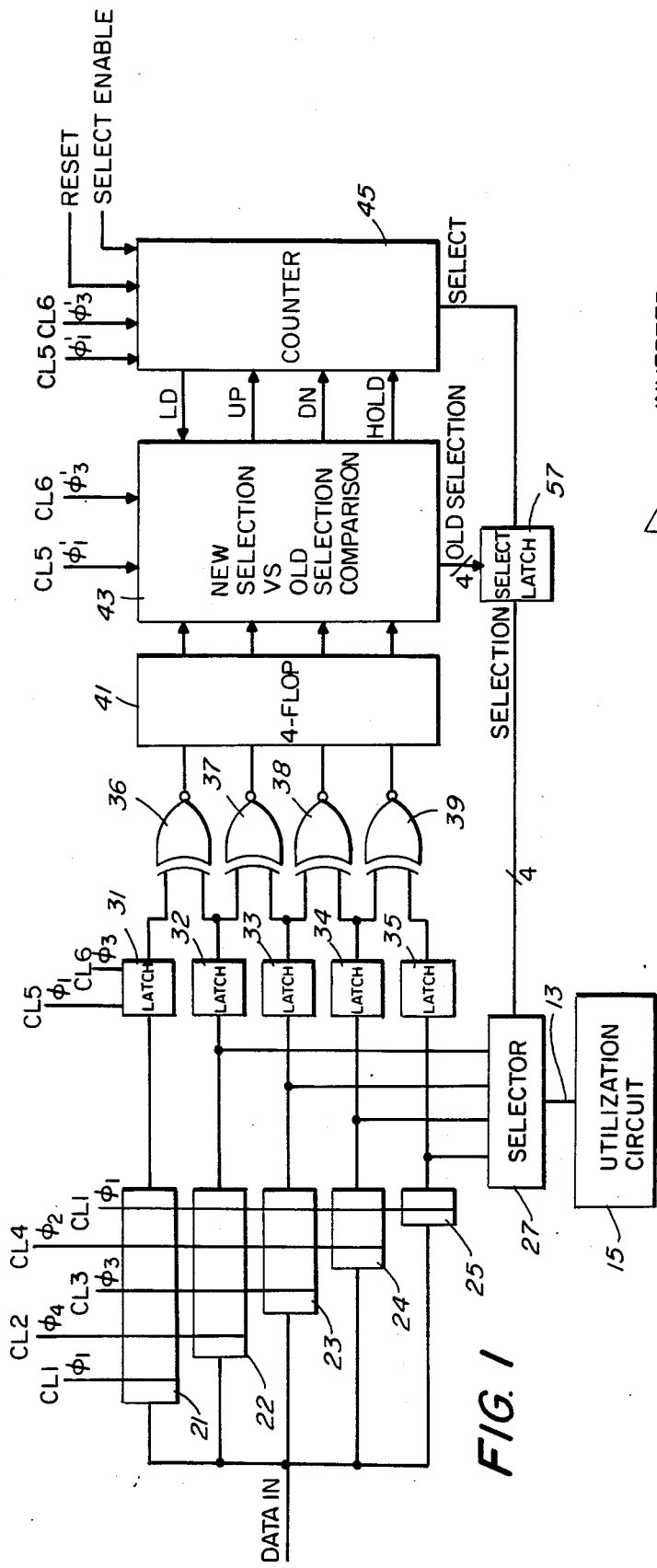
FIG. 1 is a block diagram of automatic phase adjusting apparatus as constructed in accordance with the present invention.
Figure 9:
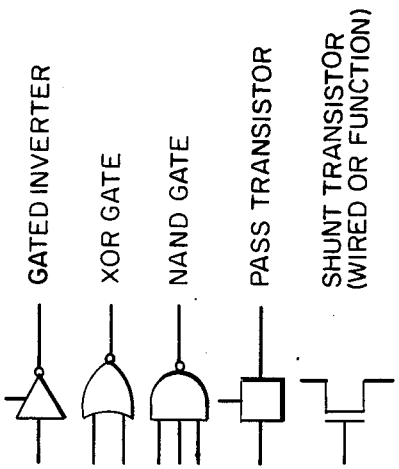
FIG. 9 is a chart defining the logic symbols used in the diagrams of FIGS. 1-5.
Figure 8:
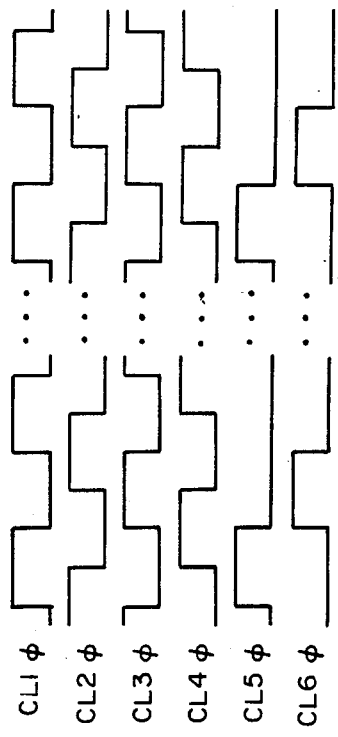
FIG. 8 is a timing diagram representing clock signals uitlized by the apparatus of FIGS. 1-5.
Figure 4:
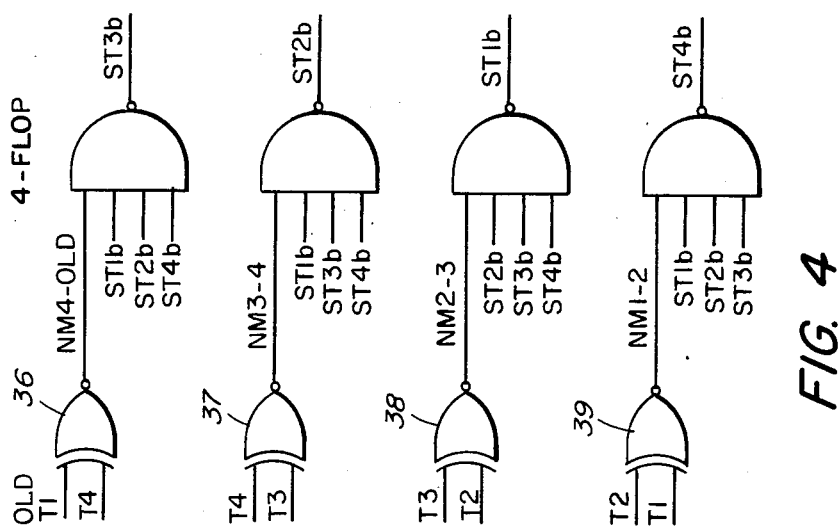
FIGS. 2-7 are more detailed logic diagrams of circuitry implementing component parts of the system of FIG. 1.

As indicated previously, it is an object of the present invention to automatically adjust the phase of data signals arriving at data utilization circuitry so as to compensate for phase shifts originating apart from the data utilization circuitry. With reference to FIG. 1, incoming data from an external source arrives on a lead designated generally by reference character 11 while the phase adjusted data is provided to utilization circuitry 13 over a lead designated generally by reference character 15.

To provide a delay which is adjustable over a range of values (durations), the apparatus illustrated employs a plurality of delay lines, five in the particular embodiment shown. These delay lines are designated by reference characters 21-25. A selector circuit 27 which is under the control of the automatic adjusting system described hereinafter is provided for coupling to the data output lead 13 a data signal which has been subjected to a delay of selected duration.

Figure 3:
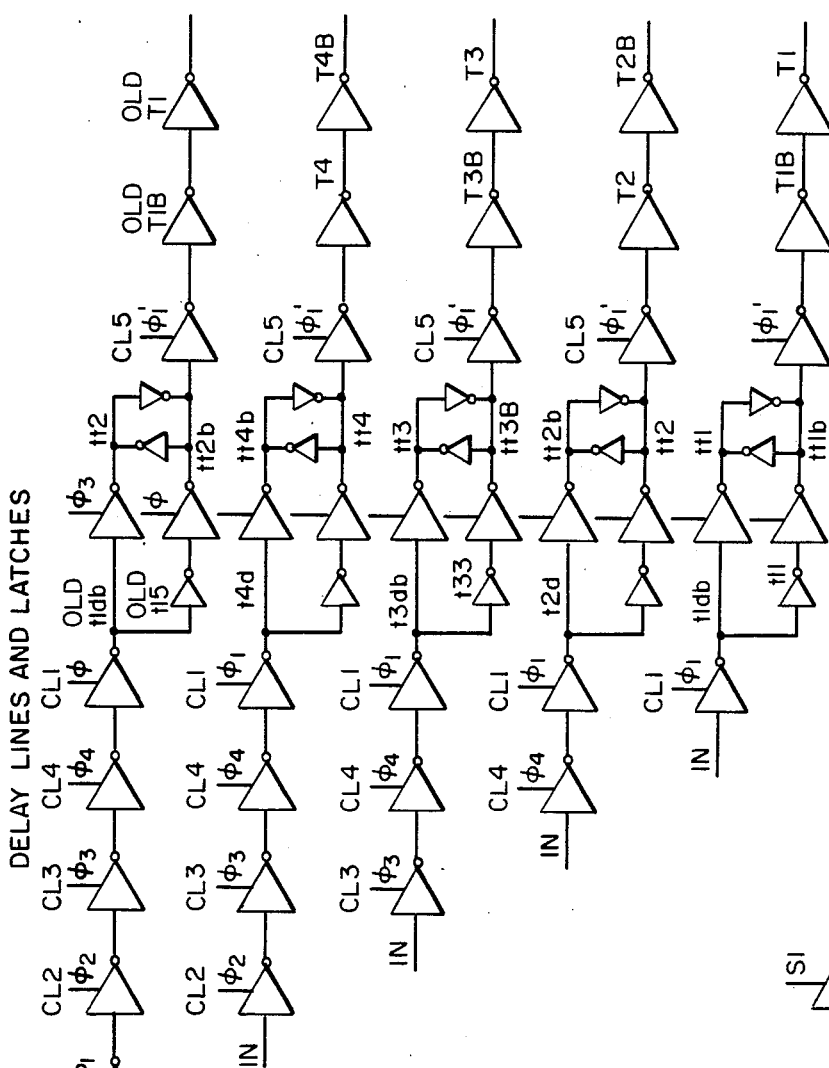
Figure 2:
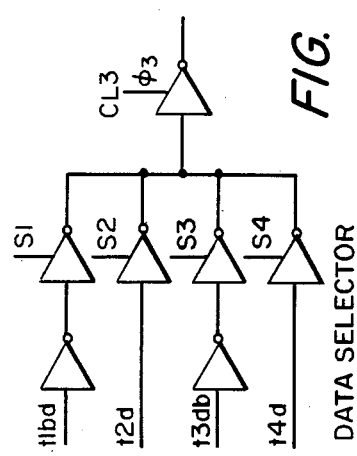
Figures 6, 7:
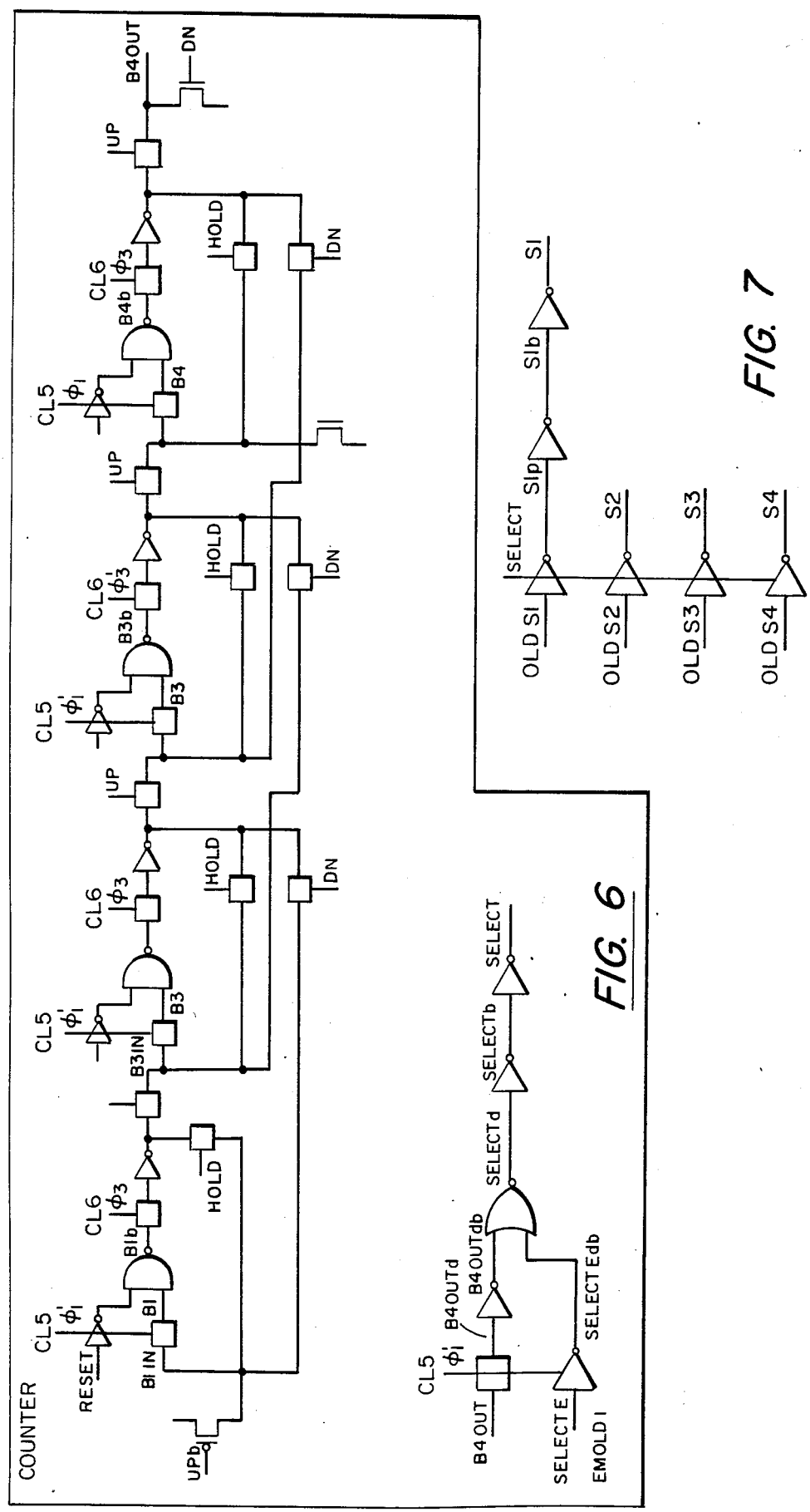

In the embodiment illustrated, the delay lines 21-25 are clocked digital delay lines, the timing for the progressive delays being controlled by four high speed clock signals CL1-CL4. Preferably, the high speed clock signals CL1-CL4 have a frequency which essentially corresponds to the nominal pulse width employed in the incoming data signals so that it can be reasonably expected that data transitions will periodically occur within the range of delays provided by the several delay lines. The relative phasing of the clock signals is represented in FIG. 6. With reference to the delay lines of FIG. 1 and also their detailed representation in FIG. 3, it may be noted that one of the clock signals CL1 is utilized twice in generating the progressive delays.

In addition to the symmetrical clock signals CL1-CL4, the apparatus of the present invention also utilizes a pair of slower clock signals CL5 and CL6. The slower clock signals comprise pulses which have an individual pulse timing which corresponds to individual pulses of the clock signals CL1 and CL3, respectively, but these pulses occur at a rate which is a sub-multiple of the high frequency clock rate.

As is described in greater detail hereinafter, the operation of the control circuitry described herein determines whether a data transition occurs in the interval between the delays provided by an adjacent pair of the successive delay lines, there being four such intervals. There are correspondingly four possible choices of delays. The longest delay is, in essence, used only to provide an endpoint for the defined interval which corresponds to the longest of the delay lines which will be considered for possible selection.

At successive points in time determined by the period of the clock signals CL5 and CL6, the state of the output signal from each of the delay lines 21-25 is captured or sampled by a respective latch 31-35. For each adjacent pair of successive delay lines, an EXCLUSIVE OR (XOR) gate is provided for combining the signals held in the respective latches, the gate output signals being designated ST1b-ST4b. As will be understood by those skilled in the art, a respective one of these gate output signals will be asserted if a data transition occurred in the interval between the successive delays provided by the two delay lines which feed that particular gate, in other words a discrepancy in the latched outputs of the respective delay lines caused by the occurence of a data signal transition in the interval defined by the two different delay values. Further, assuming that the clock rate for the data signal corresponds to the clock rate for the clock signals CL1-CL4, no more than one of the gate output signals will be asserted during each cycle of operation.

As will be understood by those versed in the art, the "asserted" state of a digital signal may be either the zero (low) or the one (high) state depending upon the logic scheme employed. In other words, the term "asserted" basically means that the necessary condition has been met. In the signal naming convention employed in FIGS. 1-5, signals whose designations end with a "b" are low when asserted and the others are high when asserted.

While transitions in the incoming data signal and the clocking of the delay lines occurs at a very fast rate, the sampling accomplished by the latches and the operation of the rest of the control circuitry is driven at a slower clock rate to assure that the various sampling latches will reach stable states before decisions are made. As will also be understood by those skilled in the art, the fact that the delay lines provide progressive delays means a very increased likelihood that one of the phase shifted data signals will arrive at one of the latches just at the instant at which it is being clocked. Accordingly, it will also be understood that there exists a chance that the latch may be thrown into a metastable state from which a substantially increased time is required to settle.

The output signals from the XOR gates 36-39 are provided to a component sub-system conveniently designated as a FOUR-FLOP. This circuit, designated generally by reference character 41, comprises four NAND gates which are interconnected to generate four signals no more than one of which can be asserted at any given time. As indicated previously, only one of the output signals from the XOR gates 36-39 should be asserted at any one time under normal circumstances, but the FOUR-FLOP 41 assures that no more than one signal is asserted.

As is explained in greater detail hereinafter, the one asserted output signal from the four-flop circuit 41 represents a possible choice for selecting one of the delayed data signals. In order to provide an operation which is stable and which provides a good, long-term (in a relative sense) choice for a compensating delay, the apparatus of FIG. 1 provides circuitry, designated generally at reference character 43, for comparing each new possible choice with a previous or "candidate" choice. The system further comprises counter circuitry, designated generally by reference character 45, for controlling the loading of new candidate choices and for changing the actual selection only after consistent behavior makes such changes logical. This latter process can be considered as one of integration or averaging.

Figure 5:
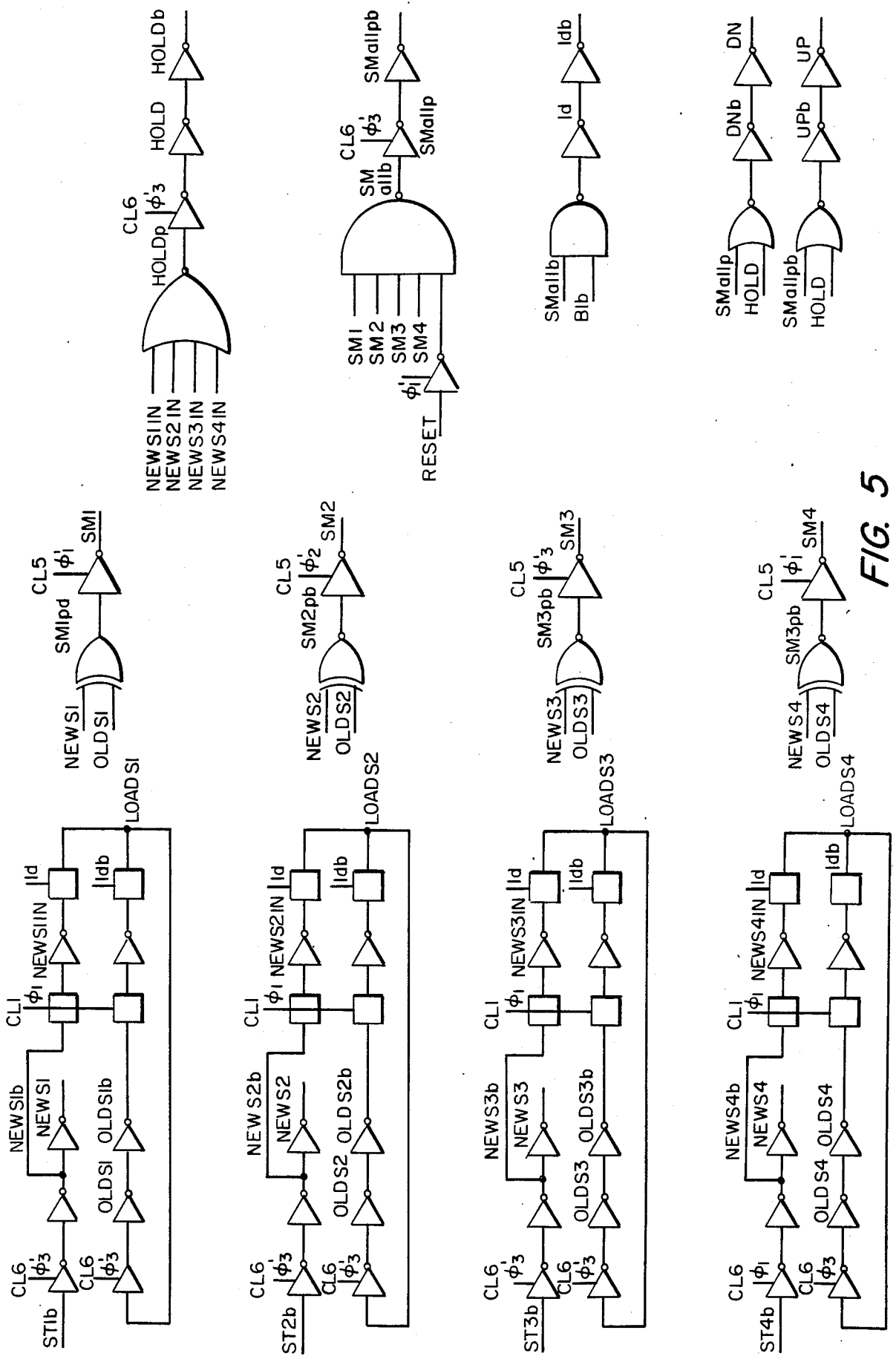

Referring now to FIG. 5 which illustrates the comparison circuitry in greater detail, it may be seen that this subsystem comprises, along the left side of the drawing, four similar gate arrays, each of which comprises, at its lower portion, a ring memory or latch which is capable of holding a value applied to the respective input lead during successive operating cycles and, in the upper series of gates, means for applying new values to the memory element. Transfer or loading of a new possible choice originating in the FOUR-FLOP circuitry to the latches in the comparison circuitry is controlled by a signal designated LD (LOAD) and its complement LDb which are generated by the counter circuitry 45 as described hereinafter. For each of these four input and latch components there is also a corresponding XOR gate system which compares the new value with the old value. The respective XOR gates are designated by reference characters 51-54. In one sense, the output signals from the XOR gates 51-54 may collectively be considered as a servo loop error signal which is used in automatically adjusting the selected value of delay as described hereinafter.

The signals generated in these first two sections of the comparison circuitry are logically combined in an array of gates designated generally by reference character 55 to generate signals, designated UP, DOWN and HOLD, which are provided to the counter circuitry 45 which provides averaging or integration as described previously. In general, it may be noted that the UP signal is generated when the new possible choice agrees with the held value; the DOWN signal is generated when the new possible choice disagrees with the held value; and the HOLD signal is generated if, within the current cycle of operation, no data transition has been detected.

The counter or integration circuitry 45 is implemented in the form of a shift register shown in greater detail in FIG. 6. This circuitry is arranged so that, in effect, a single bit is shifted up and down a linear array of four similar stages. In general, the asserted bit is shifted upwards, i.e. to the right, when the UP signal is asserted and is shifted to the left, i.e. down, when the DOWN signal is asserted. It should be noted, however, that the gates generating the UP and DOWN signals (FIG. 6) take into consideration the signal designated HOLD so that a bit is shifted neither up nor down during any cycle when the HOLD signal is asserted. As may be seen from FIG. 6, the HOLD signal is generated as a NOR function of the four signals originating in the four-flop circuitry and representing the new possible choice. However, as is understood by those skilled in the art, a data stream comprising a succession of zeros or a succession of ones will not provide transitions which can be examined by the circuitry of the present invention to aid in judging what may be the proper compensating delay. Accordingly, in accordance with the practice of the present invention, operational cycles in which there is no data transition are not counted in the integration process which effects the logical decision.

From the foregoing description, it can be seen that, in general, movement of the bit to the right shift register indicates consistency or stability in successive possible choices being presented to the comparison circuitry while shifting to the left is the response to a difference between the possible choice and the candidate (stored) choice. If the bit is shifted all the way to the right, the candidate is accepted as the actual selection and is applied, through the select latch 57, to the selector 27. Conversely, if the bit is shifted all the way to the left, the newest possible choice (represented by the output of the FOUR-FLOP circuit 41) is transferred into the latches in the comparison circuitry and becomes the new candidate choice for selection.

As described previously, the operation of the control circuitry described herein determines whether a data transition or discrepancy occurs in the interval defined by the delays provided by an adjacent pair of the successive delay lines, there being four such intervals. There are correspondingly four possible choices of delays. Since the period of the clock signals CL1-CL4 corresponds to the expected data pulse width or period, it can be seen that the four choices in one sense constitute a circular array which in effect folds back on itself. Proceeding with this analogy it can further be seen that the most desirable choice is the delay line which is opposite, within this circular array, from the delay intervals which encompasses the most transitions or discrepancies. In other words, the desirable choice is the one which provides a timing away from transitions, i.e. when the data signal is clearly in one or the other of its two stable binary states. In the signal nomenclature employed in defining the circuitry, this rotation or choice of the opposite is evidenced in the FOUR-FLOP circuitry of FIG. 4 where it can be seen, for example, that the interval T3-T2 is operative in producing a corresponding output signal (choice) ST2b while the interval T1-T2 produces a signal ST4b.

Given the present high density capability of very large scale integrated circuits, it is possible to implement the circuitry described herein in a very small portion of the available chip area and it is thus feasible to provide an automatic phase adjusting system in accordance with the present invention at each of the lead lines which bring in data from the outside world and still have sufficient remaining chip surface area for major functions, i.e. the functions incorporated and provided in the utilization circuitry.

As noted earlier, the sampling, analysis, and adjustment processes performed by the present invention do not need to be performed at a high rate. Rather, only the delay line clocking and initial latching has to be performed by high speed circuit components. Once the appropriate selection is initially established, the need to change the selection should occur relatively infrequently and only gradually. Thus, while the presently preferred embodiment employs dedicated or so-called hard wired logic to implement the desired functions, it should be understood that the comparison, analysis, and adjustment functions might also be implemented by means of programmed logic, i.e. a microprocessor or a computer. In such a case, portions of the utilization circuitry might participate in the phase adjustment function on a time-shared basis with the other or principal functions of the utilization circuitry.

Further, while the embodiment described operates by sampling whatever data transitions may exist on the input line, it should be understood that there may be some applications in which it is desirable to periodically place a predefined data pattern on the input line and to compare successively delayed versions of the input signal with a reference or standard which also has a predetermined pattern rather than a monotonic clock as in the example described.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for adjusting, in relation to a local clock signal, the relative phase of a data signal arriving at data utilization circuitry, said apparatus comprising:
   means for introducing an adjustable relative delay between the arriving data signal and the local clock signal;
   means for obtaining binary samples of the arriving data signal for a variety of delay values;
   means for detecting discrepancies between the binary values of the samples for successive greater delay values and for generating a corresponding error signal which identifies the delay value associated with the occurrence of a discrepancy;
   and control means responsive to said error signal for applying a relative delay which is substantially different from said delay value which is associated with the occurrence of a discrepancy.

2. Apparatus as set forth in claim 1 further comprising means for averaging said error signal over multiple transitions in said data signal.

3. Apparatus as set forth in claim 1 wherein said means for introducing an adjustable relative delay comprise a plurality of delay lines providing progressively greater delays.

4. Apparatus for adjusting the phase of data signals arriving at data utilization circuitry, said apparatus comprising:
   a succession of delay lines providing progressively greater delays;
   means for providing the arriving data signal to each of said lines thereby to obtain respective delayed data signals;
   selector means for providing one of sid delayed data signals to the utilization circuitry;
   means for detecting discrepancies between the delayed data signals obtained from adjacent delay lines in the succession;
   means for controlling said selector means to apply to the utilization circuitry a delayed data signal which is spaced a substantial distance along the succession from those adjacent delayed data signals which exhibit discrepancies.

5. Apparatus for adjusting the phase of a data signal arriving at data utilization circuitry to adjust for uncontrollable phase shifts in the data signal originating apart from the data utilization circuitry, said apparatus comprising:
- a succession of delay lines providing progressively greater delays;
- means for providing the arriving data signal to each of said delay lines thereby to obtain respective delayed data signals;
- selector means for providing, to said utilization circuitry, a selected one of the delayed data signals;
- means for comparing the delayed signals over a period of time and for setting said selector to a delayed data signal which is distant from the delayed data signals which bracket the most disparities.

6. Apparatus for adjusting the phase of data signals arriving at data utilization circuitry to adjust for uncontrollable phase shifts in the data signal originating apart from the data utilization circuitry, said apparatus comprising:
- a plurality of delay lines providing progressively greater delays;
- means for providing the arriving data signal to each of said lines thereby to obtain respective delayed data signals;
- selector means, responsive to a selection value signal, for providing to said utilization circuitry one of said delayed data signals selected in accordance with said selection value;
- respective latch means for acquiring and holding the instantaneous value of each said delayed data signal in response to a local clock signal;
- respective gate means responsive to the latched values for generating a signal indicating whether a transition occurred between the respective delays provided by successively adjacent delay lines, the outputs of said gate means collectively representing a possible choice of delays;
- means for comparing the gate generated signals over a period of time and for setting said selector to a delayed data signal which is distant from the delayed data signals which bracket the most transitions.

7. Apparatus for adjusting the phase of data signals arriving at data utilization circuitry to adjust for uncontrollable phase shifts in the data signal originating apart from the data utilization circuitry, said apparatus comprising:
- a plurality of delay lines providing progressively greater delays;
- means for providing the arriving data signal to each of said lines thereby to obtain respective delayed data signals;
- selector means, responsive to a selection value signal, for providing to said utilization circuitry one of said delayed data signals selected in accordance with said selection value signal;
- respective latch means for acquiring and holding the instantaneous value of each said delayed data signal in response to a local clock signal;
- combinatorial logic means for combining the held data signals values to obtain signal representing degree of match;
- state machine logic for generating and varying said selection signals as a function of said degree of match signal in a sense tending to select the delayed data signal furthest from disparities in adjacent data signals.

* * * * *